United States Patent
Inoue et al.

(10) Patent No.: US 12,496,293 B2
(45) Date of Patent: Dec. 16, 2025

(54) SOLID PHARMACEUTICAL PREPARATION

(71) Applicant: FUJI YAKUHIN CO., LTD., Saitama (JP)

(72) Inventors: Tadashi Inoue, Saitama (JP); Takashi Kodama, Saitama (JP)

(73) Assignee: FUJI YAKUHIN CO., LTD., Saitama (JP)

( * ) Notice: Subject to any disclaimer, the term of this patent is extended or adjusted under 35 U.S.C. 154(b) by 811 days.

(21) Appl. No.: 17/756,978

(22) PCT Filed: Dec. 8, 2020

(86) PCT No.: PCT/JP2020/045562
§ 371 (c)(1),
(2) Date: Jun. 7, 2022

(87) PCT Pub. No.: WO2021/117697
PCT Pub. Date: Jun. 17, 2021

(65) Prior Publication Data
US 2023/0050931 A1 Feb. 16, 2023

(30) Foreign Application Priority Data

Dec. 9, 2019 (JP) .................. 2019-221892

(51) Int. Cl.
*A61K 31/428* (2006.01)
*A61K 9/20* (2006.01)

(52) U.S. Cl.
CPC .......... *A61K 31/428* (2013.01); *A61K 9/2018* (2013.01); *A61K 9/2054* (2013.01)

(58) Field of Classification Search
CPC ............................ A61K 31/428; A61K 9/2018
See application file for complete search history.

(56) References Cited

U.S. PATENT DOCUMENTS

| 8,367,843 B2 * | 2/2013 | Kobashi | A61P 3/04 |
| | | | 548/180 |
| 2019/0389818 A1 * | 12/2019 | Uda | A61K 31/428 |

FOREIGN PATENT DOCUMENTS

| JP | 2011074017 A * | 4/2011 | A61K 31/428 |
| JP | 2017093539 A | 10/2017 | |
| WO | 2018199277 A1 | 11/2018 | |

OTHER PUBLICATIONS

Taniguchi, T. et al., "Pharmacological Evaluation of Dotinurad, a Selective Urate Reabsorption Inhibitor", J. Pharmacol. Exp. Ther., Aug. 1, 2019, vol. 371, pp. 162-170, abstract.
Motoki, K. et al., "Pharmacokinetic/pharmacodynamic modeling and simulation of dotinurad, a novel uricosuric agent, in healthy volunteers", Pharmacol. Res. Perspect., Nov. 26, 2019, e00533, pp. 1-8, doi.org/10.1002/prp2.533, abstract.
Japan Patent Office; International Search Report; Feb. 10, 2021; entire document.

* cited by examiner

*Primary Examiner* — Svetlana M Ivanova
(74) *Attorney, Agent, or Firm* — Price Heneveld LLP

(57) ABSTRACT

The purpose of the present invention is to provide a solid pharmaceutical preparation of excellent stability and producibility, the preparation including, as an active ingredient, 3-(3,5-dichloro-4-hydroxybenzoyl)-1,1-dioxo-2,3-dihydro-1,3-benzothiazole. This solid pharmaceutical preparation contains 3-(3,5-dichloro-4-hydroxybenzoyl)-1,1-dioxo-2,3-dihydro-1,3-benzothiazole or a pharmaceutically acceptable salt thereof and a sugar alcohol and/or a cellulose derivative.

8 Claims, No Drawings

SOLID PHARMACEUTICAL PREPARATION

BACKGROUND OF THE INVENTION

Technical Field

The present invention relates to a solid pharmaceutical preparation including 3-(3,5-dichloro-4-hydroxybenzoyl)-1,1-dioxo-2,3-dihydro-1,3-benzothiazole represented by the following chemical formula [hereinafter, which may be referred to as "Dotinurad" (general name) or "3,5-dichloro-4-hydroxyphenyl)(1,1-dioxo-1,2-dihydro-3H-1$\lambda^6$-1,3-benzothiazole-3-yl)m ethanone"] or a pharmacologically acceptable salt thereof as an active component.

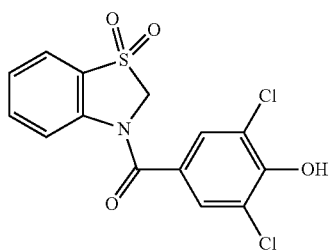

[Chem.1]

Background Art

Dotinurad is a promising compound as a therapeutic agent for gout and hyperuricemia, having a remarkable uricosuric action (JP 5325065).

A pharmaceutical product is prepared by appropriately adding additives such as excipients to an active component to obtain a pharmaceutical composition, and forming the pharmaceutical composition into a pharmaceutical preparation (for example, a solid pharmaceutical preparation, a liquid preparation, and the like) suitable for the administration route thereof, and then, the pharmaceutical product is provided and administered to a patient. Therefore, in pharmaceutical compositions and pharmaceutical preparations, it is desirable that the active component and the pharmaceutical preparation themselves are highly stable and easy to handle and take.

SUMMARY OF INVENTION

Technical Problem

JP 532506562 discloses an example of pharmaceutical preparation formulation (tablet) containing Dotinurad, and including lactose, corn starch, hydroxypropylcellulose, and magnesium stearate. However, the formulation described in the JP 5325065B2 does not suggest the formulation of the present application. A problem of the present invention is to provide a solid pharmaceutical preparation including Dotinurad as an active component, and having excellent stability and productivity.

Solution to Problem

The present inventors have studied various additives for pharmaceutical compositions including Dotinurad, and have created a Dotinurad-containing solid pharmaceutical preparation having stability after long term storage.

In other words, the present invention includes the followings:

(1) A solid pharmaceutical preparation containing 3-(3,5-dichloro-4-hydroxybenzoyl)-1,1-dioxo-2,3-dihydro-1,3-benzothiazole [Dotinurad] or a pharmacologically acceptable salt thereof as an active component, and further including one or both of sugar alcohol and a cellulose derivative as an excipient.

(2) The solid pharmaceutical preparation according to the above (1), wherein a content of the sugar alcohol is 10% by weight or more and 50% by weight or less with respect to a total weight of the solid pharmaceutical preparation.

(3) The solid pharmaceutical preparation according to the above (1) or (2), wherein the sugar alcohol is D-mannitol.

(4) The solid pharmaceutical preparation according to any one of the above (1) to (3), wherein a content of the cellulose derivative is 5% by weight or more and 30% by weight or less with respect to the total weight of the solid pharmaceutical preparation.

(5) The solid pharmaceutical preparation according to any one of the above (1) to (4), wherein the cellulose derivative is crystalline cellulose.

(6) The solid pharmaceutical preparation according to any one of the above (1) to (5), further containing lactose hydrate as an excipient.

(7) The solid pharmaceutical preparation according to the above (6), wherein a content of the lactose hydrate is 25% by weight or more and 70% by weight or less with respect to a total weight of the solid pharmaceutical preparation.

(8) The solid pharmaceutical preparation according to any one of the above (1) to (7), wherein a content of Dotinurad or a pharmacologically acceptable salt thereof is 0.125% by weight or more and 2.0% by weight or less with respect to the total weight of the solid pharmaceutical preparation.

(9) The solid pharmaceutical preparation according to any one of the above (1) to (8), further containing a disintegrant, a binding agent, and a lubricant.

(10) The solid pharmaceutical preparation according to the above (9), wherein the disintegrant includes at least one selected from the group consisting of carmellose, carmellose calcium, carmellose sodium, hydroxypropylcellulose, low-substituted hydroxypropyl cellulose, croscarmellose sodium, crystalline cellulose, carboxymethyl starch sodium, corn starch, and talc.

(11) The solid pharmaceutical preparation according to the above (9) or (10), wherein the binding agent includes at least one selected from the group consisting of low-substituted hydroxypropyl cellulose, hypromellose, methyl cellulose, polyvinyl alcohol, partially pregelatinized starch, and pregelatinized starch.

(12) The solid pharmaceutical preparation according to any one of the above (9) to (11), wherein the lubricant includes at least one selected from the group consisting of magnesium oxide, stearic acid, magnesium stearate, aluminum stearate, calcium stearate, sucrose fatty acid ester, sodium stearyl fumarate, and talc.

(13) A solid pharmaceutical preparation including Dotinurad or a pharmacologically acceptable salt thereof as an active component, containing 0.125% by weight to 2.0% by weight of Dotinurad or the pharmacologically acceptable salt thereof, 25% by weight to 70% by weight of lactose hydrate, 10% by weight to 50% by weight of D-mannitol, 5% by weight to 30% by weight of crystalline cellulose, 3% by weight to 7% by weight of carmellose, 1% by weight to 5% by weight of hypromellose, and 0.25% by weight to 1% by weight of magnesium stearate with respect to a total weight of the solid pharmaceutical preparation.

(14) The solid pharmaceutical preparation according to any one of the above (1) to (13), being a tablet.

Advantageous Effect of Invention

A solid pharmaceutical preparation of the present invention doesn't decompose a main agent (active component) and has high stability.

DETAILED DESCRIPTION OF THE EMBODIMENTS

The present invention provides a solid pharmaceutical preparation containing Dotinurad or a pharmacologically acceptable salt thereof as an active component. The solid pharmaceutical preparation contains 0.125% by weight or more and 2.0% by weight or less of Dotinurad as an active component with respect to a total weight of the solid pharmaceutical preparation.

In the present specification, when the term "Dotinurad" is used, its hydrate and solvate are also included. The pharmacologically acceptable salt of Dotinurad is not particularly limited as long as it is a pharmaceutically acceptable salt, and examples thereof include alkali metal salts and alkaline earth metal salts, and also includes hydrate and solvate thereof.

The dose per time of Dotinurad or a pharmacologically acceptable salt thereof to a human is preferably 0.1 mg to 4.0 mg.

The solid pharmaceutical preparation of the present invention contains D-mannitol as an excipient in an amount of 10% by weight or more and 50% by weight or less, and preferably 25% by weight or more and 50% by weight or less, with respect to the total weight of the solid pharmaceutical preparation.

The solid pharmaceutical preparation of the present invention preferably contains crystalline cellulose in an amount of 5% by weight or more and 30% by weight or less with respect to the total weight of the solid pharmaceutical preparation.

The solid pharmaceutical preparation of the present invention preferably contains lactose hydrate in an amount of 25% by weight or more and 70% by weight or less with respect to the total weight of the solid pharmaceutical preparation.

The solid pharmaceutical preparation of the present invention preferably contains carmellose in an amount of 3% by weight or more and 7% by weight or less with respect to the total weight of the solid pharmaceutical preparation.

The solid pharmaceutical preparation of the present invention preferably contains hypromellose in an amount of 1% by weight or more and 5% by weight or less with respect to the total weight of the solid pharmaceutical preparation.

The solid pharmaceutical preparation of the present invention preferably contains magnesium stearate in an amount of 0.25% by weight or more and 1% by weight or less with respect to the total weight of the solid pharmaceutical preparation.

In the present specification, values of % by weight of Dotinurad and the additives may include values up to ±10% of the values, preferably up to ±5% of the values.

The disintegrant in the present invention is not particularly limited, but those approved as pharmaceutical additive components are preferable. Preferable examples include carmellose (carboxymethyl cellulose), carmellose calcium, carmellose sodium, hydroxypropylcellulose, low-substituted hydroxypropyl cellulose, croscarmellose sodium, crystalline cellulose, carboxymethyl starch sodium, crospovidone, corn starch, talc, and the like, which can be used alone or in appropriate combination thereof. Carmellose (carboxymethyl cellulose), carmellose calcium, carmellose sodium, hydroxypropylcellulose, low-substituted hydroxypropyl cellulose, croscarmellose sodium, crystalline cellulose, carboxymethyl starch sodium, corn starch, and talc are preferable, and carmellose is particularly preferable.

The binding agent in the present invention is not particularly limited, but those approved as pharmaceutical additive components are preferable. Preferable examples include low-substituted hydroxypropyl cellulose, hydroxypropylcellulose, hypromellose (hydroxypropylmethylcellulose), methyl cellulose, popidone, polyvinyl alcohol, partially pregelatinized starch, pregelatinized starch, and the like. Low-substituted hydroxypropyl cellulose, hypromellose (hydroxypropylmethylcellulose), methyl cellulose, polyvinyl alcohol, partially pregelatinized starch, and pregelatinized starch are preferable, and hypromellose is particularly preferable.

The lubricant in the present invention is not particularly limited, but those approved as pharmaceutical additive components are preferable. Preferable examples include magnesium silicate, magnesium oxide, stearic acid, magnesium stearate, aluminum stearate, calcium stearate, magnesium aluminometasilicate, sucrose fatty acid ester, sodium stearyl fumarate, talc, and the like. Magnesium oxide, stearic acid, magnesium stearate, aluminum stearate, calcium stearate, sucrose fatty acid ester, sodium stearyl fumarate, and talc are preferable, and magnesium stearate is particularly preferable.

The solid pharmaceutical preparation in the present invention includes, for example, tablets (including uncoated tablets, sugar-coated tablets, orally rapidly disintegrating tablets, chewable agents, effervescent tablets, troches, film-coating tablets, and the like), pills, fine powder, powder, fine granules, granules, hard capsules, soft capsules, films, dry syrups, jellies, liquids, emulsions, syrups, injections, external preparations, suppositories, and the like. Tablet or granules are preferable, and tablet is particularly preferable.

The weight per tablet is not particularly limited, but it is preferably 50 mg to 500 mg, and further preferably 100 mg to 200 mg.

The solid pharmaceutical preparation of the present invention may use a variety of additives depending on the pharmaceutical preparation to be applied. In addition to the above excipient, disintegrant, binding agent, and lubricant, for example, disintegration aids, fluidizing agents, buffers, sustaining agents, stabilizers, antioxidants, reducing agents, cooling agents, sweetening agents, flavoring agents, aromatics, coloring agents, surfactants, plasticizer, solubilizing agents, suspending agents, dispersing agents, emulsifying agents, buffers, dissolution aids, brightening agents, coating agents, bases, antiseptic agents, preservatives, pH adjusters, and the like, can be used.

A further embodiment of the present invention is to provide a solid pharmaceutical preparation containing 0.125% by weight to 2.0% by weight of Dotinurad or a pharmacologically acceptable salt thereof, 49% by weight to 54% by weight of lactose hydrate, 24% by weight to 26% by weight of D-mannitol, 14% by weight to 16% by weight of crystalline cellulose, 3% by weight to 7% by weight of carmellose, 1% by weight to 5% by weight of hypromellose, and 0.25% by weight to 1% by weight of magnesium stearate with respect to the total weight of the solid pharmaceutical preparation.

In the specification of the present application, the water content refers to the result of measuring an amount of water included in the solid pharmaceutical preparation including Dotinurad as an active component, which is measured using an infrared moisture meter (FD-620 manufactured by Kett Electric Laboratory Co., Ltd.) (75° C., 20 minutes). Furthermore, in the specification of the present application, the water content (after drying) is the result of measuring an amount of water included in the pharmaceutical preparation by the method described above after mixing, granulating, and drying Dotinurad and the additives.

In this specification, a component content refers to the percentage (%) of the amount of the active component contained in the tablet actually produced with respect to the theoretically calculated content of the active component. In order for a solid pharmaceutical preparation including Dotinurad to effectively exhibit a medicinal effect at an appropriate dosage, the component content is preferably 95% to 110%, and more preferably 97% to 105%. In this specification, a case where the component content is less than 95% is referred to as a decrease.

EXAMPLES

Hereinafter, the present invention will be described in more detail by way of Examples, but it should not be construed that the present invention is limited to these Examples.

Productivity in each of these Examples was evaluated as follows.

++: Handling of a solid pharmaceutical preparation in the production is good
+: Handling of a solid pharmaceutical preparation in the production is fair Here, good handling indicates a case where adhesion to production equipment does not occur, and fair handling indicates a case where adhesion to production equipment is observed.

In the Examples, the component content of Dotinurad was calculated as follows. In other words, the percentage (%) of the amount of Dotinurad in a sample solution with respect to the standard solution obtained by adjusting 25 mg of Dotinurad with a solution (dissolution test solution 2:methanol=1:1) was calculated by Ultraviolet-visible Spectrophotometry (UV-2550 manufactured by Shimadzu Corporation, maximum wavelength: 326 nm), wherein the sample solution is prepared by adjusting the solid pharmaceutical preparation of each Example with the above solution to the same concentration.

Example 1: Lactose hydrate (DMV, pharmatose 200 M) in an amount of 8.0 g and Dotinurad in an amount of 0.8 g were sieved using a No. 30 stainless sieve. Lactose hydrate (DMV, pharmatose 200M) in an amount of 236.0 g, crystalline cellulose (Theoras PH-101 manufactured by Asahi Kasei Chemicals) in an amount of 48.0 g, hypromellose (TC-5E manufactured by Shin-Etsu Chemical) in an amount of 9.6 g, and carmellose (NS-300 manufactured by Nichirin Chemical) in an amount of 16.0 g were sieved using a No. 30 stainless sieve. Granulation was carried out with 31.8 g of purified water by a stirring granulator (High Speed Mixer LFS-GS-1JD manufactured by Fukae Powtec Co., Ltd.), followed by ventilation drying at 60° C. for 240 minutes, and granules were graded by using a No. 30 stainless sieve to obtain granules. To this, 1.6 g of magnesium stearate (Japanese Pharmacopoeia magnesium stearate manufactured by NOF CORPORATION) was added, and mixed. Tablets were produced by compression molding using a tableting machine (HT-AP12SS-II manufactured by Hata Iron Works) so as to have a hardness of about 7.0 kgf using a single-stage R pestle having a tablet mass of about 100 mg, a diameter of 6.5 mm, and a radius of curvature of 8.0.

Example 2: Lactose hydrate (DMV, pharmatose 200 M) in an amount of 8.0 g and Dotinurad in an amount of 0.8 g were sieved using a No. 30 stainless sieve. Lactose hydrate (DMV, pharmatose 200M) in an amount of 156.0 g, D-mannitol (Pearlitol 50C manufactured by Rocket) in an amount of 80.0 g, crystalline cellulose (Theoras PH-101 manufactured by Asahi Kasei Chemicals) in an amount of 48.0 g, hypromellose (TC-5E manufactured by Shin-Etsu Chemical) in an amount of 9.6 g, and carmellose (NS-300 manufactured by Nichirin Chemical) in an amount of 16.0 g were sieved using a No. 30 stainless sieve. Granulation was carried out with 31.8 g of purified water by a stirring granulator (High Speed Mixer LFS-GS-1JD manufactured by Fukae Powtec Co., Ltd.), followed by ventilation drying at 60° C. for 240 minutes, and granules were graded by using a No. 30 stainless sieve to obtain granules. To this, 1.6 g of magnesium stearate (Japanese Pharmacopoeia magnesium stearate manufactured by NOF CORPORATION) was added, and mixed. Tablets were produced by compression molding using a tableting machine (HT-AP12SS-II manufactured by Hata Iron Works) so as to have a hardness of about 7.0 kgf using a single-stage R pestle having a tablet mass of about 100 mg, a diameter of 6.5 mm, and a radius of curvature of 8.0.

In Examples 3 to 17, and Reference Example, tablets were produced in the same manner as in Examples 1 and 2 based on the formulation of Tables 1 to 3.

In Comparative Examples 1 and 2, tablets were produced in the same manner as in Examples 1 and 2 based on the formulations of Table 4.

The formulation rate, the productivity, the water content (after drying), and the component content of tablets produced in Examples, Reference Example, and Comparative Examples were described in Tables 1 to 4.

TABLE 1

| Formulation [mg] | Ex.1 | Ex.2 | Ex.3 | Ex.4 | Ex.5 | Ex.6 | R.Ex.1 |
|---|---|---|---|---|---|---|---|
| Dotinurad | 0.25 | 0.25 | 0.25 | 0.25 | 0.25 | 0.25 | 0.25 |
| Lactose hydrate | 76.25 | 71.25 | 66.25 | 51.25 | 41.25 | 26.25 | |
| Crystalline cellulose | 15 | 15 | 15 | 15 | 15 | 15 | 15 |
| D-mannitol | | 5 | 10 | 25 | 35 | 50 | 76.25 |
| Carmellose | 5 | 5 | 5 | 5 | 5 | 5 | 5 |
| Hypromellose | 3 | 3 | 3 | 3 | 3 | 3 | 3 |

TABLE 1-continued

| Formulation [mg] | Ex.1 | Ex.2 | Ex.3 | Ex.4 | Ex.5 | Ex.6 | R.Ex.1 |
|---|---|---|---|---|---|---|---|
| Magnesium stearate | 0.5 | 0.5 | 0.5 | 0.5 | 0.5 | 0.5 | 0.5 |
| Total | 100 | 100 | 100 | 100 | 100 | 100 | 100 |
| Productivity | + | + | ++ | ++ | ++ | ++ | ++ |
| Water content (after drying) [%] | 0.2 | 0.2 | 0.2 | 0.0 | 0.2 | 0.2 | 0.1 |
| Component content [%] | 97.3 | 103.4 | 101.2 | 100.8 | 100.8 | 98.1 | 91.0 |

Ex. = Example
R.Ex. = Reference Example

TABLE 2

| Formulation [mg] | Ex.7 | Ex.8 | Ex.9 | Ex.10 | Ex.11 | Ex.12 | Ex.13 |
|---|---|---|---|---|---|---|---|
| Dotinurad | 0.125 | 1.0 | 2.0 | 0.25 | 0.25 | 0.25 | 0.25 |
| Lactose hydrate | 51.375 | 50.5 | 49.5 | 61.25 | 36.25 | 53.25 | 49.25 |
| Crystalline cellulose | 15 | 15 | 15 | 5 | 30 | 15 | 15 |
| D-mannitol | 25 | 25 | 25 | 25 | 25 | 25 | 25 |
| Carmellose | 5 | 5 | 5 | 5 | 5 | 3 | 7 |
| Hypromellose | 3 | 3 | 3 | 3 | 3 | 3 | 3 |
| Magnesium stearate | 0.5 | 0.5 | 0.5 | 0.5 | 0.5 | 0.5 | 0.5 |
| Total | 100 | 100 | 100 | 100 | 100 | 100 | 100 |
| Productivity | ++ | ++ | ++ | ++ | ++ | ++ | ++ |
| Water content (after drying) [%] | 0.1 | 0.3 | 0.1 | 0.3 | 0.3 | 0.2 | 0.3 |
| Component content [%] | 100.6 | 97.0 | 100.7 | 98.5 | 99.6 | 100.2 | 104.8 |

Ex. = Example

TABLE 3

| Formulation [mg] | Ex.14 | Ex.15 | Ex.16 | Ex17 |
|---|---|---|---|---|
| Dotinurad | 0.25 | 0.25 | 0.25 | 0.25 |
| Lactose hydrate | 53.25 | 49.25 | 51.5 | 50.75 |
| Crystalline cellulose | 15 | 15 | 15 | 15 |
| D-mannitol | 25 | 25 | 25 | 25 |
| Carmellose | 5 | 5 | 5 | 5 |
| Hypromellose | 1 | 5 | 3 | 3 |
| Magnesium stearate | 0.5 | 0.5 | 0.25 | 1 |
| Total | 100 | 100 | 100 | 100 |
| Productivity | ++ | ++ | ++ | ++ |
| Water content (after drying) [%] | 0.4 | 0.2 | 0.1 | 0.1 |
| Component content [%] | 100.8 | 96.0 | 98.5 | 98.7 |

Ex. = Example

TABLE 4

| Formulation [mg] | Co.Ex.1 | Co.Ex.2 |
|---|---|---|
| Dotinurad | 0.25 | 0.25 |
| Lactose hydrate | 81.5 | 74.75 |
| Crystalline cellulose | 45.0 | |
| Pregelatinized starch | 7.5 | |
| Hydroxypropylcellulose | | 3.0 |
| Corn starch | 15.0 | 21.0 |
| Magnesium stearate | 0.75 | 1.0 |
| Total | 150 | 100 |
| Water content (after drying) [%] | 0.8 | 0.7 |
| Component content [%] | 102.0 | 101.6 |

Co.Ex. = Comparative Example

The tablets, in a PTP-packaged form, obtained in Example 4 and Comparative Example 1 were subjected to a stability test under an atmosphere of 40° C.±2° C. and 75% RH±5% RH. The amounts (%) of Dotinurad analogues in the tablets at initial of the test, one month after the start of the test, and three months after the start of the test were respectively calculated by high-performance liquid chromatography (Column: Inertsil ODS-2 (4.6 mm×250 mm, 5 μm), at the temperature of 40° C., mobile phase: a mixed solution of diluted formic acid (1→1000) and acetonitrile (3:2), UV detection: 240 nm). The results are shown in Table 5.

TABLE 5

| | Initial | After 1 month | After 3 months |
|---|---|---|---|
| Example 4 | 0.01 | 0.01 | 0.03 |
| Comparative Example 1 | 0.01 | 0.04 | 0.07 |

Also with Comparative Example 2, the amount (%) of Dotinurad analogue in the tablet was calculated in the same manner as in the above. The results are shown in Table 6.

TABLE 6

|  | Initial | After 1 month | After 3 months |
|---|---|---|---|
| Comparative Example 2 | n.d. | 0.03 | 0.07 | n.d. = not detected

The tablets obtained in Example 4 and Comparative Examples 1 and 2 were subjected to photostability testing under light sources emitting visible light and UV-A light at 25° C.±2° C. for 20 days under light resistant or light exposed with total exposure of 1.2 million lux hours and 200 watt hours/m$^2$ or more. The amounts (%) of Dotinurad analogues in the tablets at initial, under light resistance, or under light exposed were respectively calculated by high-performance liquid chromatography (Column: Inertsil ODS-2 (4.6 mm×250 mm, 5 µm), at the temperature of 40° C., mobile phase: a mixed solution of diluted formic acid (1→1000) and acetonitrile (3:2), UV detection: 240 nm). The results are shown in Table 7.

TABLE 7

|  | Initial | Light resistant | Light exposed |
|---|---|---|---|
| Example 4 | n.d. | n.d. | 0.03 |
| Co. Example 1 | n.d. | n.d. | 0.20 |
| Co. Example 2 | n.d. | n.d. | 0.21 | n.d. = not detected
Co. Example = Comparative Example

In Examples 1 and 2 in which the content of D-mannitol is small, adhesion to production equipment was observed. Furthermore, in Reference Example 1 in which the content of D-mannitol is large, the decrease in the component content of Dotinurad was observed. From the above result, it was shown that the preferable content of D-mannitol in the pharmaceutical preparation was from 10% by weight to 50% by weight.

From the results shown in Tables 5 and 6, it was demonstrated that the pharmaceutical preparation in Example 4 is more stable in which the generation of analogues was suppressed as compared with Comparative Examples 1 and 2. In Comparative Examples 1 and 2, it is considered that the high water content (after drying) in the formulation may have affected the stability of the tablet. On the other hand, since the water content (after drying) of each of the above-described Examples is lower than in Comparative Examples 1 and 2, it is suggested that the formulation of tablet in any one of the above-mentioned Examples is stable as in Example 4.

From the results shown in Table 7, it was demonstrated that under light exposed, as compared with Comparative Examples 1 and 2, Example 4 was a more stable formulation because the generation of Dotinurad analogues is reduced.

As mentioned above, the solid formulations of the present invention containing Dotinurad or a pharmacologically acceptable salt thereof as an active component and containing D-mannitol are more stable, and can be provided as a tablet in which the decrease in the content of Dotinurad is suppressed.

The invention claimed is:

1. A solid pharmaceutical preparation comprising Dotinurad, or a pharmacologically acceptable salt thereof, as an active component, and further comprising D-mannitol, lactose hydrate, crystalline cellulose, carmellose, hypromellose, and magnesium stearate.

2. The solid pharmaceutical preparation according to claim 1, wherein a content of the D-mannitol is 10% by weight or more and 50% by weight or less with respect to a total weight of the solid pharmaceutical preparation.

3. The solid pharmaceutical preparation according to claim 2, wherein a content of the crystalline cellulose is 5% by weight or more and 30% by weight or less with respect to the total weight of the solid pharmaceutical preparation.

4. The solid pharmaceutical preparation according to claim 3, wherein a content of the lactose hydrate is 25% by weight or more and 70% by weight or less with respect to the total weight of the solid pharmaceutical preparation.

5. The solid pharmaceutical preparation according to claim 1, wherein a content of the Dotinurad, or the pharmacologically acceptable salt thereof, is 0.125% by weight or more and 2.0% by weight or less with respect to the total weight of the solid pharmaceutical preparation.

6. The solid pharmaceutical preparation according to claim 1, being a tablet.

7. A solid pharmaceutical preparation comprising Dotinurad, or a pharmacologically acceptable salt thereof, as an active component, comprising 0.125% by weight to 2.0% by weight of Dotinurad, or the pharmacologically acceptable salt thereof, 25% by weight to 70% by weight of lactose hydrate, 10% by weight to 50% by weight of D-mannitol, 5% by weight to 30% by weight of crystalline cellulose, 3% by weight to 7% by weight of carmellose, 1% by weight to 5% by weight of hypromellose, and 0.25% by weight to 1% by weight of magnesium stearate, with respect to a total weight of the solid pharmaceutical preparation.

8. The solid pharmaceutical preparation according to claim 7, being a tablet.

* * * * *